(12) United States Patent
Shah et al.

(10) Patent No.: US 11,736,493 B1
(45) Date of Patent: Aug. 22, 2023

(54) MUTABLE ACCESS TOKENS

(71) Applicant: CITICORP CREDIT SERVICES, INC. (USA), Jacksonville, FL (US)

(72) Inventors: Mayank Shah, East Windsor, NJ (US); Gayathri Sundar, Irving, TX (US); Vernon Miller, Jacksonville, FL (US); Abhishek Acharya, Irving, TX (US)

(73) Assignee: CITICORP CREDIT SERVICES, INC. (USA), Jacksonville, FL (US)

( * ) Notice: Subject to any disclaimer, the term of this patent is extended or adjusted under 35 U.S.C. 154(b) by 0 days.

(21) Appl. No.: 17/888,939

(22) Filed: Aug. 16, 2022

(51) Int. Cl.
*H04L 9/40* (2022.01)
*G06F 21/60* (2013.01)
*H04L 29/06* (2006.01)

(52) U.S. Cl.
CPC .......... *H04L 63/102* (2013.01); *G06F 21/604* (2013.01); *H04L 63/0807* (2013.01); *H04L 63/105* (2013.01)

(58) Field of Classification Search
CPC ...... G06F 21/604; G06F 21/33; G06F 21/335; G06F 21/44; G06F 21/62; G06F 21/45; G06F 21/31; G06F 21/34; G06F 21/42; G06F 21/32; H04L 63/0807; H04L 63/08; H04L 63/0846; H04L 63/0861
See application file for complete search history.

(56) References Cited

U.S. PATENT DOCUMENTS

| | | | |
|---|---|---|---|
| 2015/0373097 A1* | 12/2015 | Konkus | H04L 67/1025 709/203 |
| 2017/0329957 A1* | 11/2017 | Vepa | G06F 21/445 |
| 2020/0076601 A1* | 3/2020 | Tabrizi | G06Q 20/38215 |

* cited by examiner

*Primary Examiner* — Edward Zee
(74) *Attorney, Agent, or Firm* — Johnson, Marcou, Isaacs & Nix, LLC; George Marcou; Scott A. Hendrix

(57) ABSTRACT

A network system to provide mutable access tokens for access requests that eliminate a need for token replacement. The system allows an access token to be changed to update data in the token. When data stored with the token changes, such as when a user or partner has a change in status, a new token is not required to be requested, generated, dispersed, or stored. Conventional systems refuse the API call request and require the new token be provided. The described system instead completes the request while simultaneously notifying the user to subsequently retrieve an updated access token. Requesting, generating, communicating, and presenting a new token requires additional time, bandwidth, computing capacity, and system interactions. While performing new token acquisition in conventional systems, devices are forced to perform additional interactions, which may result in a time delay or in one or more devices exceeding capacity, becoming overloaded, and seizing.

16 Claims, 4 Drawing Sheets

MUTABLE ACCESS TOKENS

FIELD OF THE INVENTION

The technology relates generally to the field of user authentication, and more particularly to methods and systems to provide mutable access tokens for access to data or services that eliminate a need for access token replacement when token claims change.

BACKGROUND OF THE INVENTION

Businesses and other systems conventionally provide access to programs, applications, software, and other services to users and business partners. To allow a partner to access the services, the systems utilize security programs to authenticate the partner. The partner may be a business to business ("B2B") server that desires to access services from the system. The partner may be a B2B server acting on behalf of a customer, an account, or an agent. The partner may be a client application that is owned by the partner and is operating on a user device. The partner may be a client application of the system that is embedded within a partner-owned client agent.

The system may use an industry standard such as an OAUTH 2.0 authentication standard to control the access to the services of the system. The authentication system may utilize tokens to authenticate the partners. In conventional systems, when an access token needs to be updated, the system will revoke an access token provided by the partner and require that a new token be issued before services may be provided. Requesting, generating, communicating, and presenting a new token requires additional time, bandwidth, computing capacity, and system interactions. While performing new token acquisition, user devices and partner devices are required to delay the data request. The user devices and partner devices are forced to perform additional interactions while the user is awaiting the results of the original data or service request, which may result in a time delay or even result in one or more devices exceeding capacity, becoming overloaded, and seizing. In certain examples, a user of the system may be forced to re-enter customer data to obtain a new access token, such as by providing an additional authorization to restart the token process.

DETAILED DESCRIPTION

Example System Architecture

Figure 1:
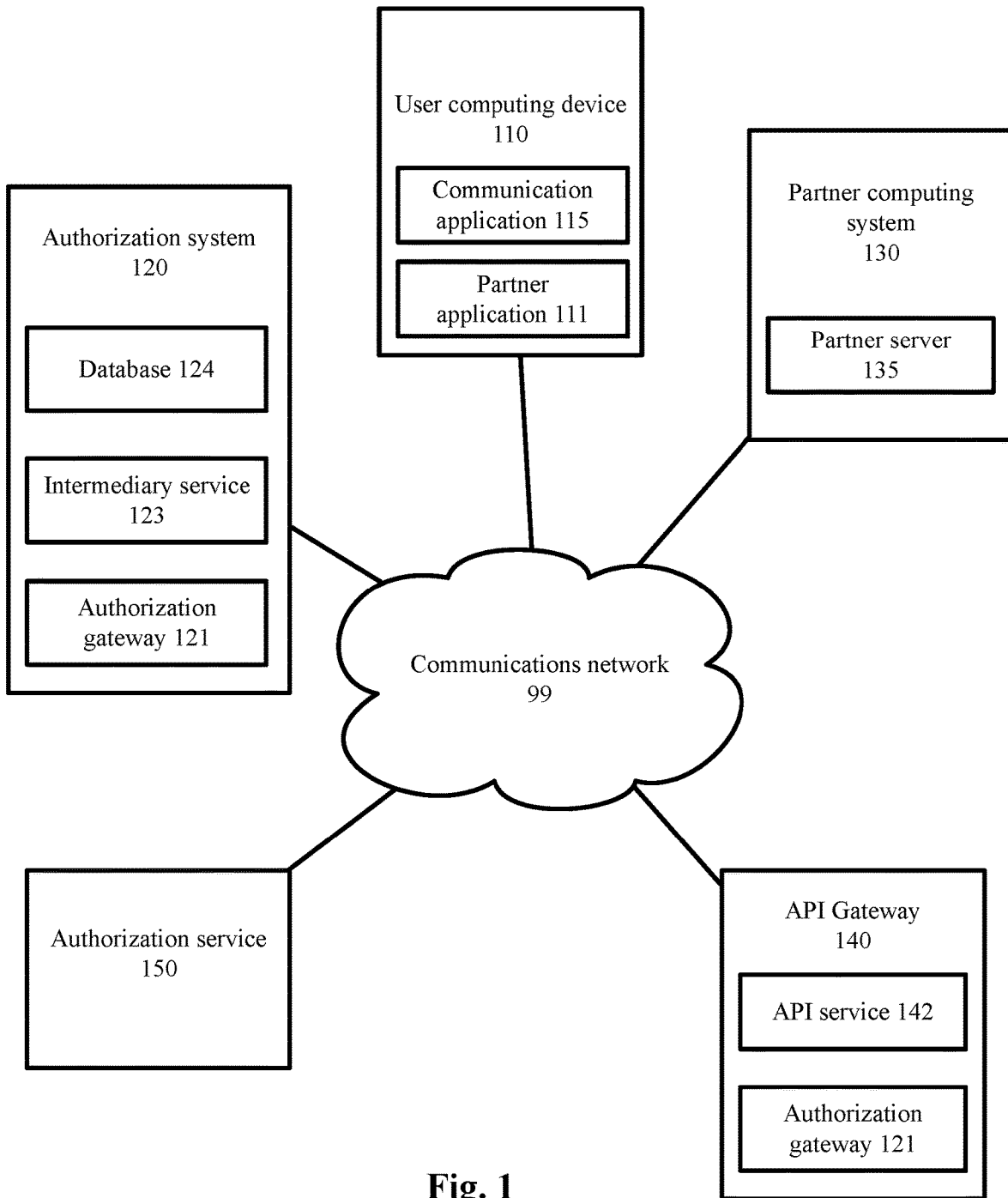
FIG. 1 is a block diagram depicting a system to provide mutable access tokens.

FIG. 1 is a block diagram depicting a system to provide mutable access tokens. As depicted in FIG. 1, the architecture 100 includes a user computing device 110, an authorization system 120, a partner computing system 130, an API gateway 140, and an authorization service 150 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user that may communicate with a partner computing device 130 to perform any procedure requiring an authorization. The partner computing device 130 may be operated by a merchant, a third-party platform, a server that provides an application to user computing device 110, or any other type of partner system. The partner computing system 130 may represent a business or other entity that conducts B2B interactions with the authorization system 120. The authorization system 120 may be operated by a service provider that provides application services, financial services, transaction services, database services, or any other type of service that utilizes applications and data. While each server, system, and device shown in the architecture is represented by one instance of the server, system, or device, multiple instances of each can be used.

As shown in FIG. 1, the user computing device 110 includes a data storage unit (not shown) accessible by a communication application 115. The communication application 115 on the user computing device 110 may be, for example, a web browser application or a stand-alone application, to view, download, upload, or otherwise access documents, user interfaces, or web pages via the networks 99. The communication application 115 can interact with web servers or other computing devices connected to the network 99, such as by conducting and authorizing an interaction with the partner computing system 130, the authorization system 120, the API gateway 140, and the authorization service 150.

The user computing device 110 includes a partner application 111. The partner application 111 may be any type of software, hardware, application, program, webpage, or other type of application that is used by the user computing device 110 to provide a service via the partner system 130 operating the partner computing server 135. For example, the partner application 111 may be an application that manages a financial account of a user with a financial system associate with the authorization system 120. The partner application 111 may be provided by, supported, monitored, and/or facilitated by the partner server 135. The partner server 135 may provide services to allow the partner application 111 to access software or data at the authorization system 120. In another example, the partner application 111 is not utilized by the human user of the user computing device 120, but is a background application that allows B2B interactions between the authorization system 120 and the user computing device 110 or others.

As shown in FIG. 1, the partner computing system 130 includes a data storage unit (not shown) accessible by a partner server 135. The partner server 135 on the partner computing system 130 may interact with web servers or other computing devices connected to the network 99, such as by managing interactions with the user computing device 110 and the authorization system 120. In certain examples, the partner server 135 represents the end user of the services of the authorization system 120. That is, the partner server 135 does not manage an application for a user computing device 110, but is instead the client, user, or B2B partner.

As shown in FIG. 1, the authorization system 120 includes authorization gateway 121API service 142, authorization service 150 and database 124. Each of these functions or devices may be encoded in hardware or software, may be functions of a device of the authorization system 120 such as a server, may be in a cloud-based computing environment, may be separate devices connected to other devices of the authorization system 120, or may be functions or algorithms operating on other devices of the authorization system 120.

The authorization gateway 121 provides access tokens to partner servers 135 for access to the API service 142. The authorization gateway 121 may operate on the API service 142 or the authorization system 120 or may operate on both the API service 142 and the authorization system 120. For example, the authorization gateway 121 may be software application that is a function of both the API service 142 and the authorization system 120 to allow the operations of the authorization gateway 121 to be performed by either or both of the API service 142 and the authorization system 120 jointly. The authorization gateway 121 receives customer data, client IDs, and other information from the partner server 135 and provides generates, stores, communicates, and/or receives tokens. The authorization gateway 121 may provide a security barrier that prevents partner servers 135 from communicating with API services 122 unless authorized.

The database 124 may be any storage system for tokens, token claims, data, customer information, or any other data that the authorization system 120 stores, logs, organizes, files, or retrieves. The database 124 may be a function of a device of the authorization system 120 such as a server, may be in a cloud-based computing environment, may be separate devices connected to other devices of the authorization system 120, or may be functions or algorithms operating on other devices of the authorization system 120.

The API gateway 140 includes the application programming interface ("API") service 142 provides services via applications for users of the user computing device 110. The applications may include applications such as consumer API applications for verifying data, accessing information, managing accounts, performing transactions or other interactions, storing data, or any other suitable application or function. The API gateway 140 may include the authorization gateway 121, as described herein.

The authorization service 150 acts as an intermediary to allow data to be communicated from the partner server 135 to functions of the authorization system 120 and the API gateway 140. The authorization service 150 may serve as a load balancer for incoming data and requests, a first level of perimeter defense against intrusions, or perform any other suitable tasks to support the authorization system 120. The authorization service 150 may be a separate computing system or may be a function of another computing system described herein, such as the authorization system or the API gateway 140.

Figure 3:
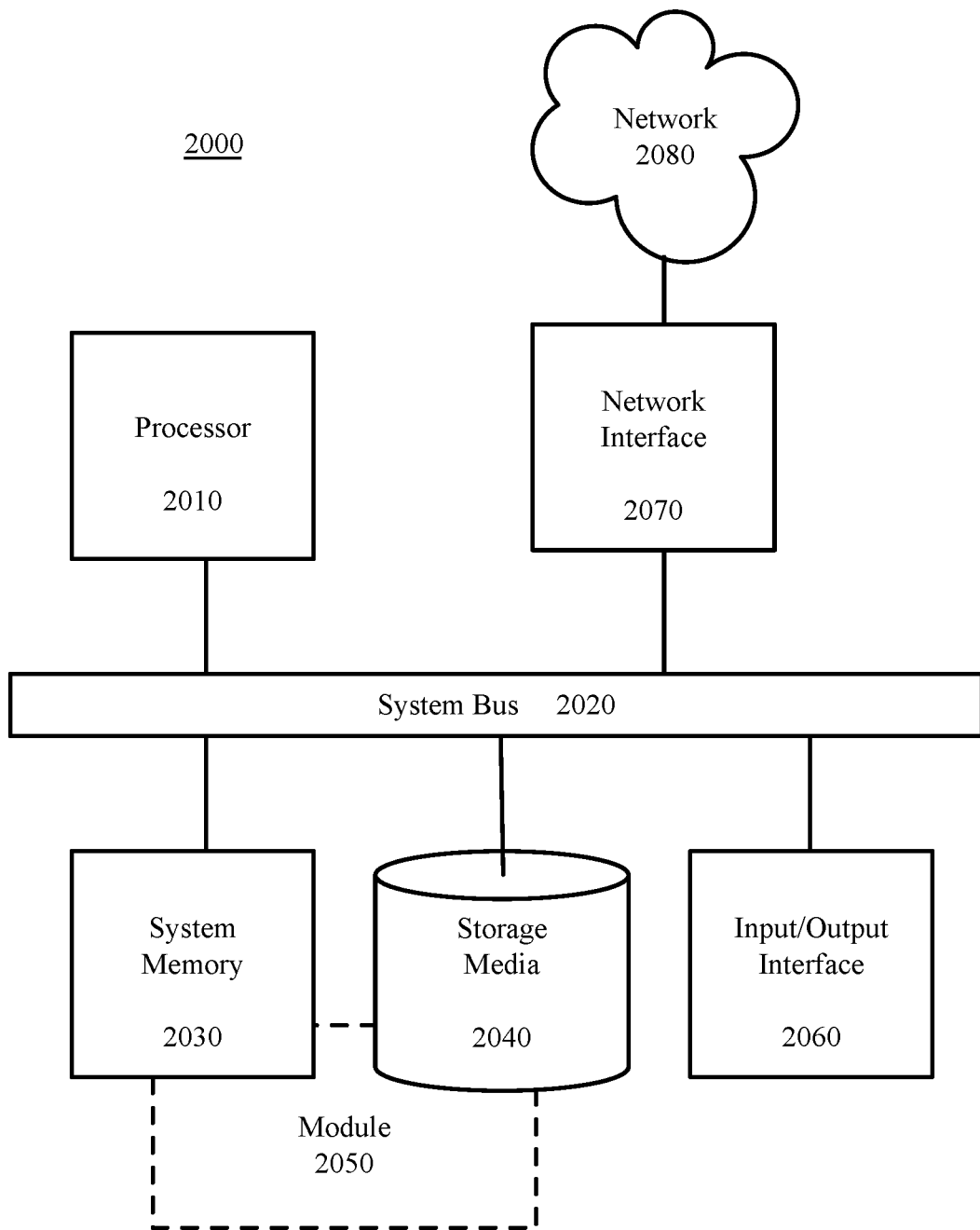
FIG. 3 depicts a computing machine and a module to provide mutable access tokens.

In example embodiments, the network computing devices and any other computing machines associated with the technology presented herein may be any type of computing machine such as, but not limited to, those discussed in more detail with respect to FIG. 3. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 3. The computing machines discussed herein may communicate with one another, as well as with other computing machines or communication systems over one or more networks, such as network 99. The network 99 may include any type of data or communications network, including any of the network technology discussed with respect to FIG. 3.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology for embodiments of the invention may employ methods and systems to provide mutable access tokens for data and service requests, such as for an application programming interface ("API") request, that eliminate a need for token replacement. The system allows an access token to be changed to update data in the token. Conventional tokens are not changeable, and conventional systems require new tokens to be issued when data in the token requires updating. With mutable tokens, when data stored with the token changes, such as when a user or partner has a change in status, a new token is not required to be requested, generated, dispersed, or stored. Conventional systems refuse the API call request and require the new token be provided before performing any tasks or providing any data or services. In the technology herein, the system instead completes the request in the API call from the user while simultaneously notifying the user to retrieve, at a later time, an updated access token. The system saves bandwidth, storage capacity, processing capacity, and time when claims or other token data of an existing token is updated, instead of requiring a new token. The partner receives requested data faster when tokens are updated instead of replaced. The system uses less storage space for token data because fewer tokens are required to be stored when tokens can be updated. While performing new token acquisition in conventional systems, user devices and partner devices are required to delay the data request. The user devices and partner devices are forced to perform additional interactions while the user is awaiting the results of the original data or service request, which may result in a time delay or even result in one or more devices exceeding capacity, becoming overloaded, and seizing. In certain examples, a user of the system may be forced to re-enter customer data to obtain a new access token, such as by providing an additional authorization to restart the token process.

The examples for embodiments of the invention may employ computer hardware and software, including, without limitation, one or more processors coupled to memory and non-transitory computer-readable storage media with one or more executable computer application programs stored thereon, which instruct the processors to perform such methods.

The example methods illustrated in FIGS. 2-3 are described hereinafter with respect to the components of the example communications and processing architecture 100.

Figure 2A:
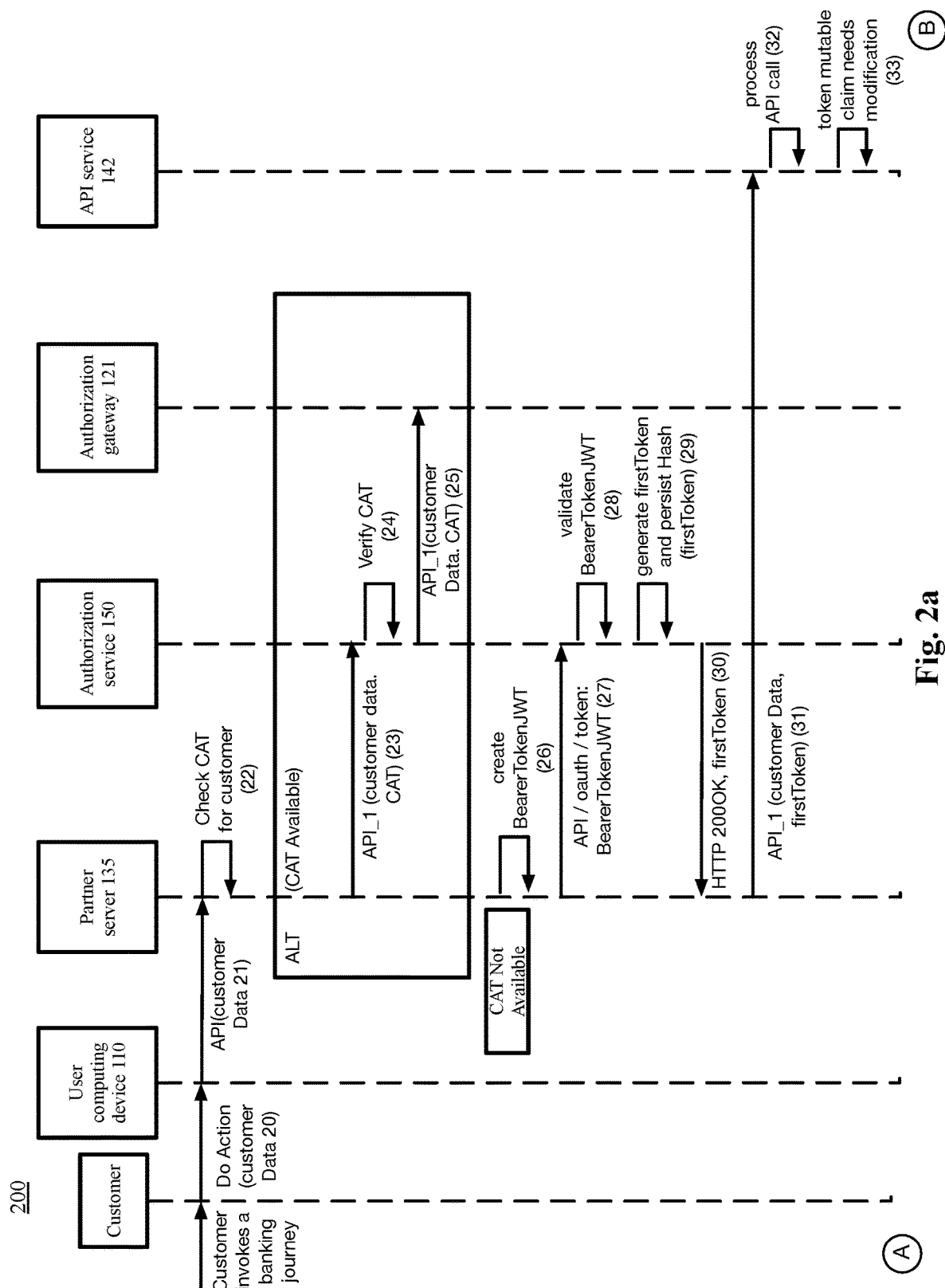
FIG. 2a is a block flow diagram depicting a method to provide mutable access tokens.

FIG. 2a is a block flow diagram depicting a method 200a to provide mutable access tokens. Depicted in the flow diagram 200a and 200b are a user computing device 110, a partner server 135, an authorization service 150, an authorization gateway 121 of the authorization system 120, and an API service 142 of the authorization system 120. The authorization system 120, as described herein, may be a function of a business or financial institution or other institution that manages an account for a customer or performs other functions for a customer, a business partner, or entity. In one example, the authorization system 120 is a bank that issues a credit card, debit card, prepaid card, or other type of payment instrument to a customer. In another example, the authorization system 120 is an institution that manages business-to-business ("B2B") interactions to manage financial systems, social media interactions, communication systems, network systems, or any other type of interactions. The business that is operating the authorization system 120 may use the features described herein to manage any other suitable functions related to the account.

In block 20, a customer, or user, invokes an interaction journey. In the example, the journey may be a banking journey or other type of user interaction with a business or institution. The user may open an application on a user computing device 110, access a website, or perform any other action to initiate the journey.

In block 21, the user computing device 110 initiates an API call with customer data. The API call may be any request for service or data from an API service 142. APIs are software-to-software interfaces that allow different applications on different devices to communicate and exchange information or functionality. The APIs allow a device, such as a business server, to access another device's data, piece of code, software, or services to extend the functionality of the device's own software. The API call in the example is a message with a request to provide a service or information. Certain API calls occur between servers or other devices behind the scenes from a user. For example, the API call may be a request for account data of a customer, such as an account balance or an amount owed for a payment. The API call may be a B2B request for a data exchange. The API call may be a request to perform a transaction of other interaction. The API call may be a request for access to data, a location, a program, or other secure data or service. The API call may be any type of communication in which a user computing device 110 or the partner server 135 desires to interact with a service of the authorization system 120.

In an example, the user may initiate a request on a user computing device 110 by entering a selection on a graphical user interface function. The graphical user interface function may be associated with an application or other software or hardware that is configured and communicated to the user computing device 110 by the authorization system 120, by the partner server 135, or another provider. In the example, the user computing device 110 may access a mobile application, a webpage, or other type of communication application 115 that allows the user computing device 110 to communicate with the partner server 135. Any similar type of interface used by the partner server 135 to communication digitally with the user in this manner may referred to herein as a mobile application.

The user enters customer data on the user interface of the mobile application and transmits that selection to the partner server 135. The customer data may represent any user information required to establish the connection and the token claims. The customer data may include an authorization from the customer or user to proceed with the request. For example, the user may be required to verify that the user authorized the request, such as by initiating a user interface object, providing a password, or performing any other suitable verification.

The customer data may include service selections, data requests, or other data. The customer data may include a client ID, a user computing device 110 identification, a username, a password, account data, or any other suitable data related to the partner system 120, the user, a user computing device 110, or any other entity or device.

The customer data may be provided by any other suitable source, such as another device associated with the authorization system 120 or a third-party device. In certain examples, the customer data is not related specifically to a human user or user account but to a system or entity. For example, the user computing device 110 may be a device of a business or institution that performs business to business ("B2B") functions with the authorization systems 120. The customer data may be entered by an operator of the business or by a software or hardware-based function of the user computing device 110. The user computing device 110 may operate automated software that provides the customer data to the partner server 135.

In another example, the partner server 135 itself may provide the customer data. For example, the partner server 135 may be a customer, user, or entity that provides customer data and requests to the authorization system 120. That is, the partner server 135 is not acting as an intermediary for the user computing device 110 but is itself the end user.

In block 22, the partner server 135 verifies if a Common Access Token ("CAT") is available. The partner server 135 accesses account data associated with the user and determines if the user has a valid CAT stored with the account. The CAT may have been stored from a previous interaction with the API service 142, provided to the partner server 135 in preparation for future API calls, or provided at any other suitable time. If a CAT is available, then the method 200 proceeds to block 23. In this example, a bearer token is not required from the partner server 135.

In block 23, the partner server 135 communicates the CAT and the customer data with an API call to the authorization service 150. The API call may be a request for any data or service from the API service 142.

In block 24, the authorization service 150 verifies the CAT provided by the partner server 135. The authorization service 150 may use any suitable method to verify that the CAT is valid, is associated with the user, is appropriate for the request, or includes any other suitable parameters of the CAT.

In block 25, the authorization service 150 communicates the API call and the customer data to the authorization gateway 121. The authorization service 150 performs functions to allow data to be communicated from the partner server 135 to functions of the authorization system 120. The authorization service 150 may serve as a load balancer for incoming data and requests, a first level of perimeter defense against intrusions, or perform any other suitable tasks to support the authorization system 120. The authorization service 150 may be a function of the authorization system 120, a third-party application, a function of the partner system 130, or any other system. In certain application, an authorization service 150 is not used and the CAT or other access token and the request are communicated directly to the authorization gateway 121.

Returning to block 22, if the CAT in block 22 is not available, then the method 200 proceeds to block 26 to begin obtaining a first token.

In block 26, the partner server creates a bearer token. The partner server 135 creates a bearer token and a request for a valid first access token. The bearer token is a lightweight security token that grants the bearer access to a protected resource. The bearer token may be a single string which acts as the authentication of the API request, sent in an HTTP Authorization header. For example, the communication may include an Authorization: Bearer SCA-JWS in the header.

In the example, the authorization process undertaken by the partner server 135 may be a mutual transport security layer ("mTLS") authorization. The mTLS process is an authorization protocol that is used in certain zero trust security frameworks to verify users, devices, and servers and to keep APIs secure. The partner server 135 creates a bearer token on behalf of the user computing device 110. The bearer token may include claims that categorize, list, quantify, or otherwise log features or attributes of the user, the user account, the partner server 135, or other type of customer. Based on the particular set of claims, the services or data to which the user is allowed access is determined by the authorization system 120.

In an example, the partner server 135 recognizes that the request or communication from the user computing device 110 will require an authorization from the authorization system 120 to access any data or service. The partner server 135 generates a bearer token authenticating the identification of the user computing device 110. The bearer token is transmitted to the authorization service 150 for presentation to the authentication system 120. The bearer token presents a strong customer assertion ("SCA"). The bearer token may utilize a JWS Header as the means of representing singed content using JSON data structures. Any other standard protocol systems may be utilized, or a custom programing protocol may be utilized.

In block 27, the partner server 135 communicates an API/OAUTH/TOKEN with the created bearer token. The API/OAUTH/TOKEN is a request that a first access token be generated and provided to the partner server 135 along with the original API request for a service or data. In other authorization protocols, different call formats may be utilized.

In block 28, the authorization service 150 validates the bearer token. The authorization service 150 receives the bearer token and the request from the partner server 135, such as with the API/OAUTH/TOKEN. The authorization service 150 may verify that the request is from an authenticated account or otherwise verifies that the request is not fraudulent. In an example, the authorization service 150 may validate the bearer token by forwarding the bearer token to a configured external introspection endpoint for token validation. In another example, the authorization service 150 validates the bearer token locally, such as by using public key certificates, shared keys, or any other suitable validation method.

In block 29, if the bearer token is validated, the authorization service 150 generates the first token and persists the hash(first token). A hash function is a mathematical function that converts an input value into a compressed numerical value—a hash or hash value. The hash value is a processing unit that takes in data of arbitrary length and gives you the output of a fixed length, which is the hash value. Hashing algorithms take any input and convert it to a uniform message by using a hashing table. Hashing uses functions or algorithms to map object data to a representative integer value. A hash can then be used to narrow down searches when locating these items on that object data map. In an example, the authorization service 150 stores the first token claims as a hashed value in a token database, such as database 124. When provided in a subsequent return communication, the first token directs the authorization service 150 or the API service 142 to the first token claims when hashed. When providing the first token, the partner server 135 sends the raw token in each API request, and the authorization service 150 can validate the token by hashing the token in the request and comparing the hashed token with the hash stored within the database 124.

In block 30, the authorization service 150 provides an HTTP: 200 OK status code and the first token to the partner server 135.

The 200 OK status code is a status code in the response that indicates that the request was successful. The 200 OK status code indicates that the request for an access token has been received, the contents of the request were sufficient, and the first access token has been generated. Any other type of code or notification may be used based on the authorization protocol being used by the system.

In block 31, the partner server 135 communicates an API call to the API service 142 with the first token. The API call includes the first token in the communication. The first token serves as an authentication of the partner server 135. The first token verifies to the API service 142 that the partner server 135 is the same entity as the entity that first communicated the bearer token and the customer data. The API service 142 is assured that the partner server 135 is not a fraudulent actor impersonating the partner server 135.

In block 32, the API service 142 processes the API call. The API service 142 is assured that the partner server 135 is not a fraudulent actor impersonating the partner server 135 based on the received first token. The API service 142 proceeds to identify the request in the API call and determine what actions to take. For example, if the API call is a request for data, then the API service 142 may access the data, such as in a database 124. If the API call is a request for a service, then the API service 142 may perform the service, such as by transferring an asset from one account to another. Any suitable API action may be taken to respond to the API call.

In block 33, the API service 142 recognizes that the first token has mutable claims that require modification.

In a continuing example that illustrates a mutable claim of a token, the journey of the user in the system may trigger a designation of a USER ROLE for the user, the customer, the partner server 135, or any other user (collectively referred to as a user). The USER ROLE may be based on factors such as whether the user has logged in, if the user has an existing account, or the standing of the user account with the business. The USER ROLE parameter options may proceed over time for a user from VISITOR to ENHANCED_VISITOR to CUSTOMER to DEMOTED_CUSTOMER. For example, as a CUSTOMER, the user will have access to a greater number of services from the API service 142 than with other USER ROLES. In the example, the number of services from the API service 142 to which the user has access increases as the USER ROLE changes from VISITOR to ENHANCED_VISITOR to CUSTOMER. If the user is downgraded to DEMOTED_CUSTOMER, for example, the user will have a reduced number of services than then the USER ROLE was defined as CUSTOMER.

In the example, one or more status characteristics of the customer data of the user or the partner server 135 has changed. Based on the change, the first token is not current because the new characteristic is different than the characteristic that is stored in the claims of the first token. Certain claims in the first token may be classified in a set of claims for which any changes require an updated token to be issued. For example, certain claims, such as USER ROLE or client ID, may require updated tokens to be issued, while other claims, such as user device ID, do not require updated tokens to be issued. The claims that require updated tokens when changed may be configured by the authorization system 120, by a protocol manager, or any other suitable entity or device.

For example, a customer associated with the first token has had a change of status in the USER ROLE. This claim in the token determines the types of data or services to which the user is authorized. In the example, the user has had a change of USER ROLE from VISITOR to the USER ROLE of CUSTOMER. As a CUSTOMER, the user will have access to a greater number of services from the API service 142. In the example, the number of services from the API service 142 to which the user has access increases as the USER ROLE may proceed from VISITOR to ENHANCED_ VISITOR to CUSTOMER. If the user is demoted from CUSTOMER to DEMOTED_CUSTOMER, for example, the number of services to which the user has access will decrease.

When the user changes USER ROLE, the first token is no longer valid. In the example, the first token that was generated when the user was a VISITOR will not grant the user access to all the services available now that the user is a CUSTOMER.

In conventional systems, the first token will require replacement by an updated token because of a change to customer data associated with a claim that is configured to require an updated token. In the example, the claim associated with USER ROLE is configured to require an updated token to allow the user to be authorized as a CUSTOMER. In conventional systems, the API service 142 will reject the first token and communicate a message to the partner server 135 that the partner server 135 should restart the process, as in block 21 to block 30, to register a new token with the new USER ROLE. Only after a new token is generated and subsequently provided with a new API call will the requested service be provided. Requesting, generating, communicating, and presenting a new token requires additional time, bandwidth, computing capacity, and system interactions. While performing new token acquisition, user devices and partner devices are required to delay the data request. The user devices and partner devices are forced to perform additional interactions while the user is awaiting the results of the original data or service request, which may result in a time delay or even result in one or more devices exceeding capacity, becoming overloaded, and seizing. In certain examples, a user of the system may be forced to re-enter customer data to obtain a new access token, such as by providing an additional authorization to restart the token process.

Figure 2B:
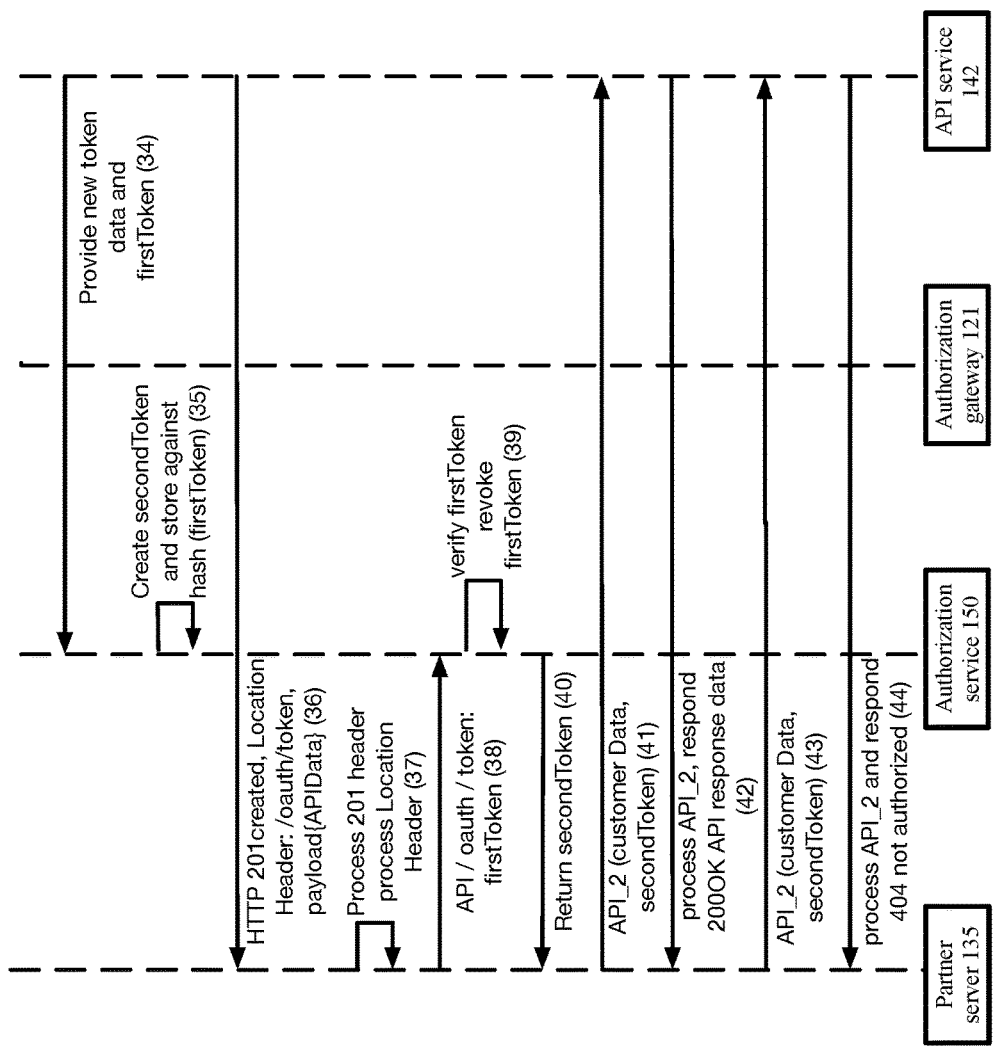
FIG. 2b is a continuation of the block flow diagram depicting a method 200a to provide mutable access tokens.

From block 33, the method 200 proceeds to FIG. 2b to resume the method 200 at block 34.

FIG. 2b is a continuation of the block flow diagram depicting a method 200a to provide mutable access tokens.

In block 34, the API service 142 provides new token data and the first token to the authorization service 150. The new token data may include any parameters or other data on the token that needs to be changed to reflect the new customer data. For example, if the USER ROLE has changed from VISITOR to CUSTOMER, then the change will be communicated from the API service 142 to the authorization service 150.

In block 35, the authorization service 150 generates a second (or updated) token and persists the hash(second token). The second token has the mutated claims recognized by the API service 142. The authorization service 150 stores the hash. Alternatively, the authorization service 150 updates the first token with the new information. The first token after receiving new or revised claims is referred to as a second token or updated token. For example, the authorization service 150 updates the parameter on the first token that stores the USER ROLE and changes the parameter from VISITOR to CUSTOMER. Any other suitable changes may be performed. The updated token will have a claim that stores the USER ROLE as CUSTOMER.

In block 36, the API service 142 provides the API response (payload) and an HTTP: 201 CREATED Location response providing a location to retrieve an updated token with the Location having the same URL endpoint as when the first token is requested. In the example, the API service 142 recognizes that the USER ROLE associated with the first token has changed. Instead of rejecting the request and requiring a new token, the API service 142 communicates the response to the request along with an HTTP: Status 201 CREATED Location response. The 201 response is not a rejection of the request in the API call, but instead is an instruction that the request is fulfilled based on the first token and the partner server 135 has instructions for obtaining a mutated, updated token. In other examples, different types of notifications or responses may be used based on the type of authorization protocol that is being used.

The instructions in the response include data in a LOCATION header in the 201 response to access the updated token. The instructions in the LOCATION header provide a hyperlink or other tool to allow the partner server 135 to be directed to the digital location to access the updated token. LOCATION headers may be used in conjunction with a 201 response. The LOCATION header may direct the client to a digital location for subsequent communications. For example, the hyperlink may direct the partner server 135 to initiate a new handshake with the authorization service 150 to obtain the updated token, as described in block 28 through block 30. In other examples, different types of headers or notifications may be used based on the type of authorization protocol that is being used.

The API service 142 fulfils the request based on the data in the first token. For example, if the user has increased a USER ROLE from VISITOR to CUSTOMER, the API service 142 may only fulfil the request if the request is approved for a VISITOR. The user does not receive the benefits of the upgraded status until the updated token is provided, but any benefit afforded to the new USER ROLE is provided. However, conventional systems would not provide any service at all to fulfil the request because the token is no longer current.

When the API service 142 fulfils the request, even though at a lower access level, all parties in the process operate more efficiently with fewer communications, less wasted time, and less processing requirements. The request may be fulfilled by any suitable response from the API service 142. For example, if the request was for an exchange of data, then the response may include the requested data. If the request was for access to a secure location, then the response may include data to allow access. If the request was for a transaction, then the response may include a summary of the conducted transaction. Any other suitable response may be provided.

In block 37, the partner server 135 processes the 201 header and the LOCATION header. The partner server 135 recognizes that the API call has been fulfilled and that a new access token will be required for subsequent API calls. The partner server 135 recognizes the location to fetch the second token from the LOCATION header.

In block 38, the partner server 135 places a subsequent API/OAUTH/TOKEN and the first token to the authorization service 150.

In block 39, the authorization service 150 attempts to verify the first token and revokes the first token. The authorization service 150 created the second token in block 35 and recognizes that the first token is no longer valid. The first token is revoked.

In block 40, the authorization service 150 returns the second token to the partner server 135. The partner server 135 is able to utilize the second token in any further API calls.

In block 41, the partner server 135 communicates an API call to the API service 142 with the second token and the customer data. The API call includes the second token in the communication. The second token serves as an authentication of the partner server 135. The second token verifies to the API service 142 that the partner server 135 is the same entity as the entity that communicated the first API call. The API service 142 is assured that the partner server 135 is not a fraudulent actor impersonating the partner server 135.

In block 42, the API service 142 communicates a response to the API call and an HTTP: 201 OK header. The response may perform the task or provide data requested in the API call. The HTTP: 201 OK signals to the partner server 135 that the request was fulfilled, and no further actions are required.

In block 43, the partner server 135 communicates an API call to the API service 142 with the first token and the customer data. In the subsequent call to the same API service 142 as called in block 21, the partner server 135 may provide the first token due to an error by the user device 110, an error by the partner server 135, a fraudulent request attempt, or any other suitable reason. The first token has been revoked, and the API service 142 is unable to be assured that the partner server 135 is not a fraudulent actor impersonating the partner server 135.

In block 44, the API service 142 communicates an HTTP: 404 Not Authorized header as the response to the API call. The response may perform the task or provide data requested in the API call. The HTTP: 404 signals to the partner server 135 that the request was not fulfilled because the first token had been revoked. The partner server 135 is required to obtain a new token or provide a new API call using the second token.

In alternative examples, if a partner server 135 does not obtain the second token, then the API service 142 may still respond to future API calls from the partner server 135, but without the new updated permissions. That is, if the user has been upgraded from VISITOR to CUSTOMER, rather than refusing the request as in a conventional system, the user would still have access to the services at the VISITOR level, but not be provided with services at the CUSTOMER level. In another example, if a partner server 135 does not obtain the updated token, then the API service 142 may not respond to future API calls from the partner server 135 until the partner server 135 obtains the updated first token.

Example Systems

FIG. 3 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to utilize mutable access tokens, comprising:
a storage device; and
a processor in a network system communicatively coupled to the storage device, wherein the processor executes application code instructions that are stored in the storage device to cause the system to:
generate an access token based on a request from a partner server;
communicate the access token to the partner server;
receive a data request from the partner server with the access token;
determine that a claim associated with the access token has changed;
provide data responsive to the data request, the data responsive to the data request further comprising a notification that the access token has changed and instructions to the partner server to obtain an updated access token;
receive a request from the partner server for the updated access token based on the notification;
communicate an instance of the updated access token to the partner server;
receive a subsequent data request from the partner server with an instance of the updated access token;
verify the updated access token by comparing the instance of the updated access token that was received to the updated access token that was communicated; and
provide a response to the subsequent data request.

2. The system of claim 1, further comprising application code instructions to cause the system to:
determine that the claim has changed to allow fewer permissions to the partner server; and
limit the provided data responsive to the data request to data that is commensurate with the allowed permissions.

3. The system of claim 1, further comprising application code instructions to cause the system to:
determine that a claim of the updated access token has changed to allow a greater number of permissions to the partner server; and
limit the provided data responsive to the data request to data that is commensurate with permissions allowed by the access token until the partner server has provided the updated access token.

4. The system of claim 1, further comprising application code instructions to cause the system to:
receive a notification, from a separate computing device associated with the processor, that a claim on the access token has changed.

5. The system of claim 1, wherein the partner server manages an application on a user computing device, the application being associated with the network system.

6. The system of claim 1, wherein the partner server manages applications in a business-to-business interaction with the network system.

7. The system of claim 1, wherein a claim that has changed is a user role with the network system.

8. The system of claim 1, wherein the access token is provided under an OATH 2.0 standard.

9. The system of claim 1, wherein the notification that the access token has changed is provided in a 201 Created header.

10. The system of claim 1, wherein the instructions for the partner server to receive the updated access token are provided in a LOCATION header.

11. The system of claim 1, wherein the access token is stored as a hash value in a database.

12. A method to all utilize mutable access tokens, comprising:
receiving, by one or more computing devices, a request from a user computing device for data associated with a user account;
generating, by one or more computing devices, an access token based on a request from a partner server;
communicating, by one or more computing devices, the access token to the partner server;
receiving, by one or more computing devices, a data request from the partner server with the access token;
determining, by one or more computing devices, that a claim associated with the access token has changed;
providing, by one or more computing devices, data responsive to the data request, the data responsive to the data request further comprising a notification that the access token has changed and instructions to the partner server to obtain an updated access token
receiving, by one or more computing devices, a request from the partner server for the updated access token based on the notification;

creating, by one or more computing devices, the changed claim of the access token to create the updated access token;

communicating, by one or more computing devices, an instance of the updated access token to the partner server;

determining, by one or more computing devices, that the claim has changed to allow a greater number of permissions to the partner server; and limiting, by one or more computing devices, the provided data responsive to the data request to data that is commensurate with permissions allowed by the updated access token until the partner server has provided an instance of the updated access token.

13. The method of claim 12, further comprising:

receiving, by one or more computing devices, a subsequent data request from the partner server with an instance of the updated access token;

verifying, by one or more computing devices, the instance of the updated access token received in the subsequent data request by comparing the instance of the updated access token received in the subsequent data request to the instance of the updated authentication token that was communicated; and providing, by one or more computing devices, a response to the subsequent data request.

14. The method of claim 12, further comprising:

determining, by one or more computing devices, determine that the claim has changed to allow fewer permissions to the partner server; and limiting, by one or more computing devices, the provided data responsive to the data request to data that is commensurate with the allowed permissions.

15. The method of claim 12, wherein the partner server manages an application on a user computing device, the application being associated with the one or more computing devices.

16. The method of claim 12, wherein the partner server manages applications in a business-to-business interaction with the one or more computing devices.

* * * * *